United States Patent
Johnson et al.

(10) Patent No.: US 7,689,930 B2
(45) Date of Patent: *Mar. 30, 2010

(54) NAVIGATION OF AN N-DIMENSIONAL HIERARCHICAL STRUCTURE USING A 2-DIMENSIONAL CONTROLLER

(75) Inventors: Eric Johnson, Ottawa (CA); Ronald Anthony Dicke, Ottawa (CA)

(73) Assignee: Research In Motion, Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/406,396

(22) Filed: Mar. 18, 2009

(65) Prior Publication Data
US 2009/0183119 A1 Jul. 16, 2009

Related U.S. Application Data

(63) Continuation of application No. 11/127,720, filed on May 12, 2005, now Pat. No. 7,523,416.

(60) Provisional application No. 60/570,066, filed on May 12, 2004.

(51) Int. Cl.
*G06F 3/048* (2006.01)
(52) U.S. Cl. ............... 715/810; 714/46; 715/854
(58) Field of Classification Search ......... 715/802, 715/206, 810, 854; 341/176; 701/211; 345/169, 345/157; 714/707, 46
See application file for complete search history.

(56) References Cited

U.S. PATENT DOCUMENTS

| | | | |
|---|---|---|---|
| 5,948,040 | A | 9/1999 | DeLorme et al. |
| 6,037,936 | A | 3/2000 | Ellenby et al. |
| 6,072,485 | A * | 6/2000 | Barnes et al. ......... 715/802 |
| 6,094,156 | A * | 7/2000 | Henty ............... 341/176 |
| 6,266,098 | B1 | 7/2001 | Cove et al. |

(Continued)

FOREIGN PATENT DOCUMENTS

EP 0 947 921 A 10/1999

(Continued)

OTHER PUBLICATIONS

3100 Installation Instructions and User Manual 1066173100 Bell ExpressVu User Guide, Rev. 05/01 Copyright 2001, Bell ExpressVu L.P., North York, ON, M7B 2R2, Canada.

*Primary Examiner*—David Ton
(74) *Attorney, Agent, or Firm*—Eckert Seamans Cherin & Mellot,LLP; David C. Jenkins, Esq.; Brij K. Agarwal, Esq.

(57) ABSTRACT

A system and method for navigating a multi-hierarchical menu system using a two-dimensional controller, comprising displaying an $N^{th}$ level of the multi-hierarchical menu system having a plurality of icons in proximity to a pointer on a portion of a display, scrolling the icons in a first dimension relative to the pointer responsive to operating the controller in the first dimension, and one of either selecting one of the icons in closest proximity to the pointer responsive to operating the controller in a first direction of a second dimension, or displaying a $N+1^{th}$ level of the multi-hierarchical menu system relative to one of the icons in closest proximity to the pointer responsive to operating the controller in an opposite direction of the second dimension.

18 Claims, 4 Drawing Sheets

U.S. PATENT DOCUMENTS

| | | |
|---|---|---|
| 6,377,890 B1 * | 4/2002 | Doi .................... 701/211 |
| 6,396,475 B1 | 5/2002 | Ellenby et al. |
| 6,496,842 B1 * | 12/2002 | Lyness .................... 715/206 |
| 6,907,575 B2 | 6/2005 | Duarte |
| 7,123,242 B1 * | 10/2006 | Henty .................... 345/169 |
| 7,233,316 B2 * | 6/2007 | Smith et al. ................ 345/157 |
| 2005/0009571 A1 | 1/2005 | Chiam et al. |
| 2006/0164389 A1 | 7/2006 | Ringot |

FOREIGN PATENT DOCUMENTS

| | | |
|---|---|---|
| EP | 1 333 362 A1 | 8/2003 |
| WO | 98/37694 A | 9/1998 |
| WO | 00/25198 A | 5/2000 |
| WO | 02/05079 A2 | 1/2002 |
| WO | 02/097597 A1 | 12/2002 |

* cited by examiner

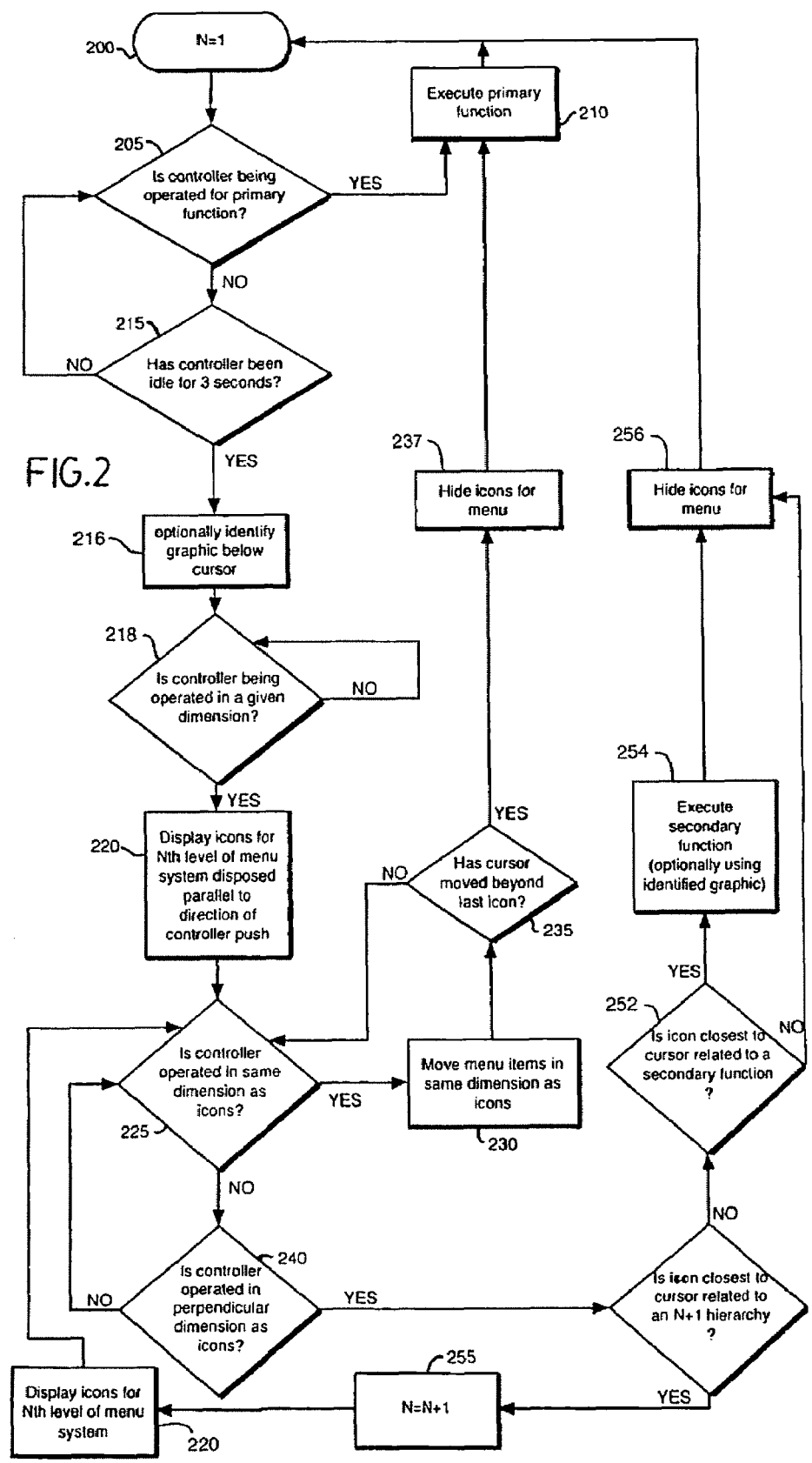

NAVIGATION OF AN N-DIMENSIONAL HIERARCHICAL STRUCTURE USING A 2-DIMENSIONAL CONTROLLER

CROSS-REFERENCE TO RELATED APPLICATION

The present application is a continuation of U.S. patent application Ser. No. 11/127,720, filed May 12, 2005 (now U.S. Patent No.7,523,416 which issued on Apr. 21, 2009), and claims priority from U.S. Provisional Application Ser. No.60/570,066, filed May 12, 2004, the contents of which are incorporated herein by reference.

BACKGROUND

1. Field

The present specification is directed generally to the navigation of a graphical user interface (GUI), and more particularly to the navigation of a multi-hierarchical menu system using a two-dimensional controller.

2. Description of the Related Art

In a typical GUI, a user is provided with a system of hierarchical menus that must be navigated using a mouse or other pointing device (e.g. trackball, digitizing tablet, directional keypad, etc.). Although such menu system navigation is relatively straightforward when using a conventional desktop or laptop computer, significant impediments to usage arise when the GUI operates on a small electronic apparatus, such as a wireless communication device and/or GPS receiver, where space limitations dictate use of a pointing device with limited directional control (e.g. a 4-directional cross-shaped keypad or a five-way selector on wireless communication device). Moreover, the presentation of layered hierarchical menus on such a device may detract from its primary use and limit interaction with the device (e.g. where the device is a GPS receiver, the presentation of layered hierarchical menus tends to clutter the display of map information, interfere with pan functions, etc.).

BRIEF DESCRIPTION OF THE DRAWINGS

FIG. 2 depicts a flowchart illustrating a method for navigating a multi-hierarchical menu system of the electronic device, according to the preferred embodiment.

DETAILED DESCRIPTION OF THE PREFERRED EMBODIMENTS

It is an aspect of the present specification to set forth a system and method for navigating a multi-hierarchical menu system of an electronic device with limited display area using a two-dimensional controller, such as a four-directional cross-shaped control pad or other limited input device.

To that end, a system and method are provided for navigating an N-dimensional hierarchical menu structure using a two-dimensional controller, by displaying a $N^{th}$ level of the hierarchical menu structure in proximity to a pointer on a portion of a display by operating the controller in a first dimension, and one of either selecting a function related to an icon within the Nth level or displaying a $(N+1)^{th}$ level of the hierarchical menu structure by operating the controller in a second dimension perpendicular to the first dimension, or moving the Nth level of the hierarchical menu structure relative to the pointer by operating the controller in the first dimension.

According to another aspect, the menu system may be navigated without interfering with a primary function of the electronic device. To that end, the menu system may be activated only after a predetermined period of primary function inactivity. For example, where the primary function is panning of a map navigation system, the menu system may be automatically displayed after a time-out period after the user ceases to operate the controller for the purpose of panning. Furthermore, after the timeout period, but before displaying the menu, the direction of controller operation can be advantageously used to direct the relative location and orientation of the menu on the display so as to minimize interference with the display.

These together with other aspects and advantages which will be subsequently apparent, reside in the details of construction and operation as more fully hereinafter described and claimed, reference being had to the accompanying drawings forming a part hereof, wherein like numerals refer to like parts throughout.

Figure 1:
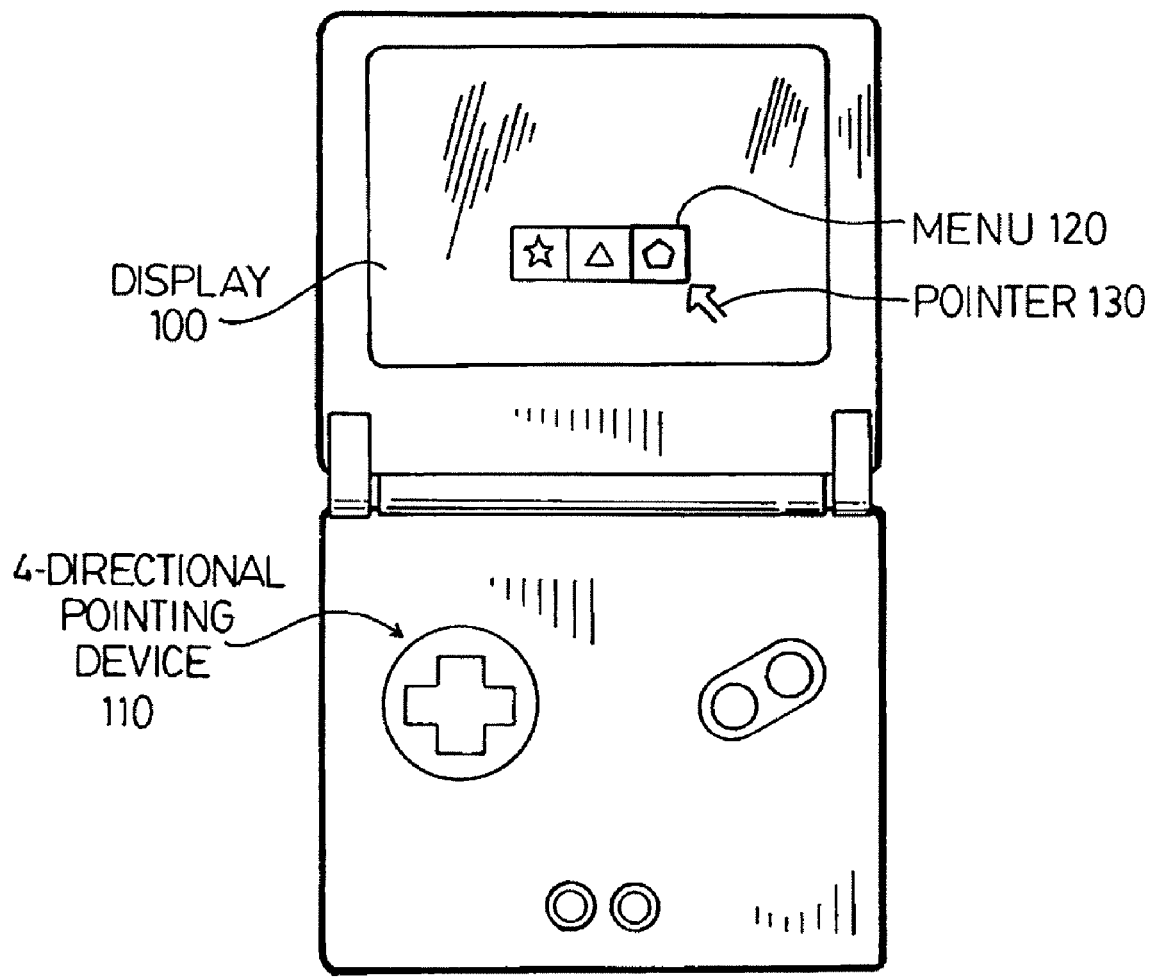
FIG. 1 is an illustration of an electronic device with limited display area and two-dimensional controller.

In FIG. 1, an electronic device is shown with limited area display 100 and a two-dimensional (i.e. four-directional) controller 110. The device incorporates a processor for implementing at least a primary function, as is well known in the art. A graphical user interface (GUI) is presented to the user as a first level of a hierarchical menu 120 having a plurality of icons selectable via a pointer 130. The term "icon", as used in the specification means any graphic representation on the display representing a function that can be selected by operating the controller 110. As discussed in greater detail below, the icons of menu 120 are navigable by operating the controller in a first dimension (e.g. left or right buttons, where the dimension is horizontal), thereby causing the menu 120 to move in the first dimension relative to pointer 130. A second level of the hierarchical menu (not shown) may be displayed by operating the controller in the first direction of a second dimension (e.g. the down button, where the dimension is vertical), or the icon may be selected by operating the controller in the opposite direction of the second dimension (e.g. the up button).

Figure 3A:
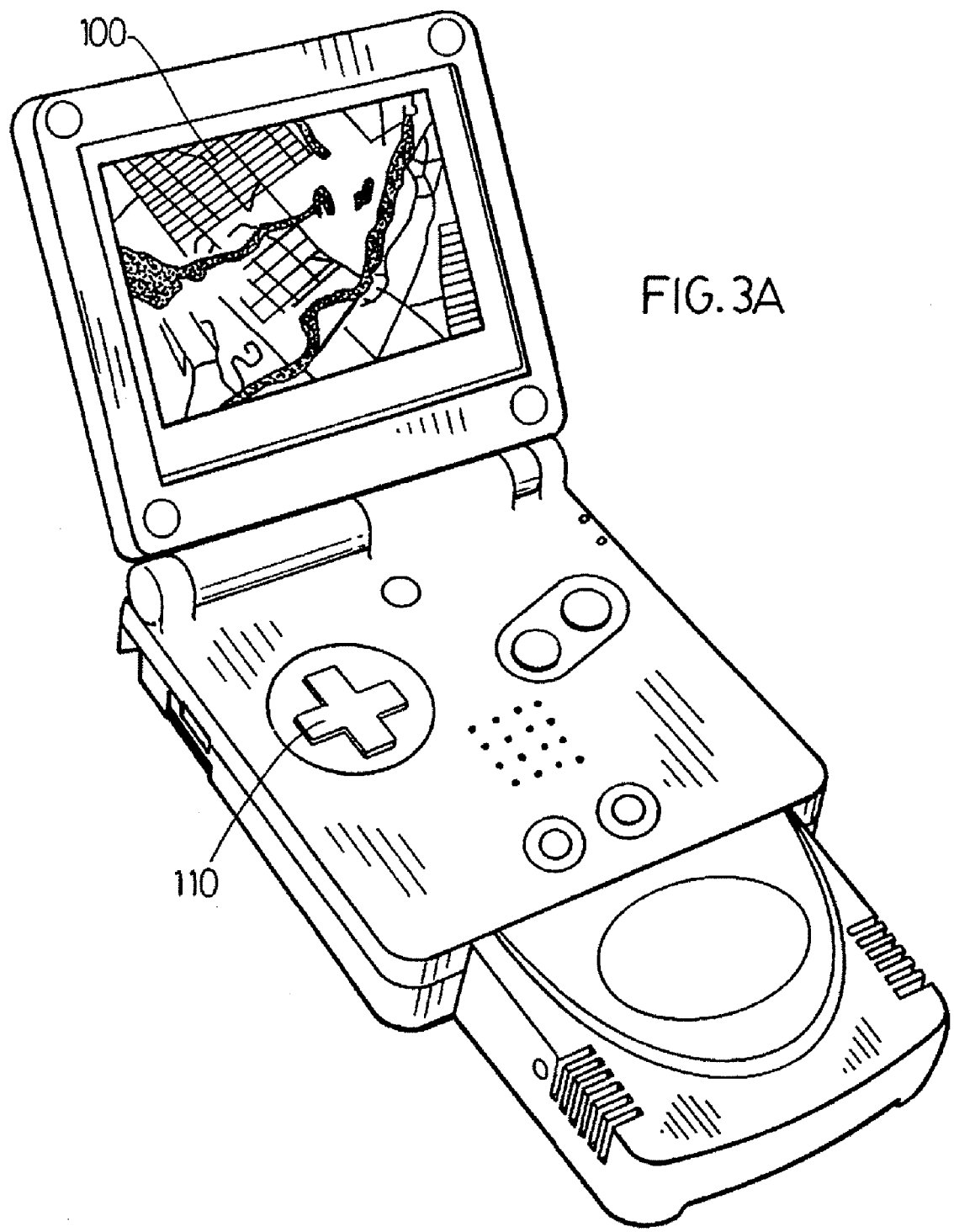
FIGS. 3A and 3B, together, illustrate various screens of a graphical user interface (GUI) implementing the method of FIG. 2.
Figure 3B:
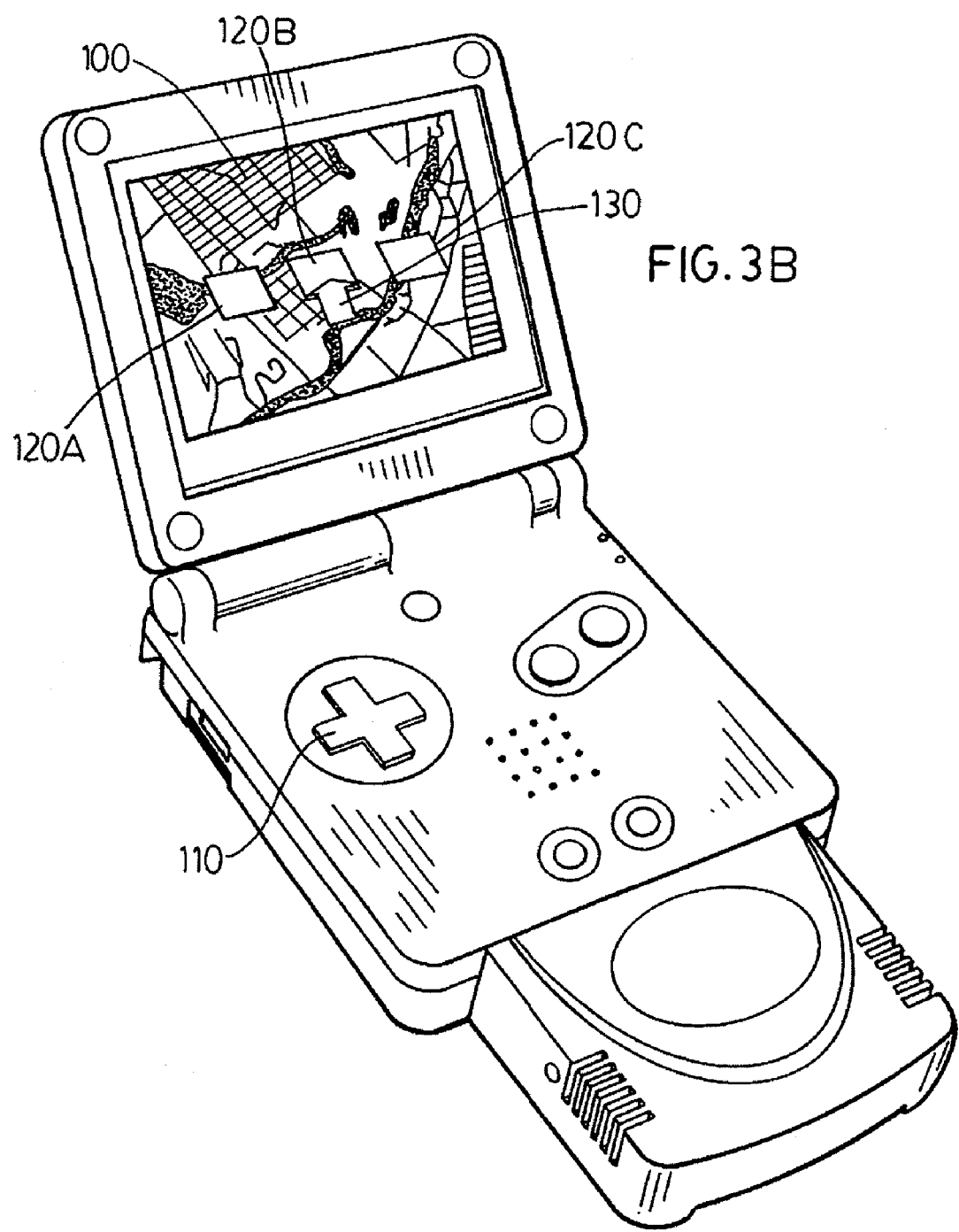

Turning to FIG. 2, an index (N) representing the level of menu hierarchy is initially set to 1 (step 200). In operation a user operates the controller 110 (step 205) to execute the afore-noted primary function of the device (step 210). For example, where the device 110 incorporates a GPS receiver, the primary function may be panning of a map navigation system. FIG. 3A shows the device 110 executing the primary function of panning a map. It will be noted that no icons 120 are displayed. By depressing and holding the controller 110 in one of its four directions (within two dimensions), the map depicted in display 100 is caused to pan in the direction that the device 110 is being pressed (i.e. up, down, left or right). As long as the controller 110 continues to be operated by the user, the primary function persists (step 210).

If the user releases the controller 110, the primary function (e.g. map panning) ceases, and the display 100 remains static for a predetermined time-out period (step 215). Although as illustrated the timeout period is 3 seconds, it is envisaged that those of ordinary skill in the art can use other timeout periods to adapt FIG. 2 to a particular purpose. Next, graphics (such as streets, lakes, or other map features in a map application for example) are (optionally) identified (step 216) and a software control loop is entered to detect operation of the controller 110 in any dimension (step 218). Upon detection of controller operation, the first level (N=1) of the hierarchical menu is presented to the user (step 220), with the icons 120 displayed parallel to the direction of controller movement (detected at step 218). This advantageously enables the user to affect the position and orientation of the menu over the background display, to ensure for example that a select area of the display (showing an area of interest in a map for example) remains uncluttered by the menu. As shown in FIG. 3A, icons 120A, 120B and 120C are displayed over the background image (e.g. a map). Preferably, the icons 120 are context sensitive to the state of the device display. For purposes of clarity, the icons in FIG. 3A are shown as blank boxes, without graphics. However, preferably the icons depict graphics that are, as indicated above, context sensitive and indicative of a function to be performed. For example, icon 120A may depict a graphical image of binoculars for initiating a search function, icon 120B may depict a push-pin for entering a GPS waypoint, and icon 120C may depict a 'U-turn' graphic for causing the map to return to the GPS current location.

In response to the user operating the controller 110 in the same dimension (step 225) as the icons 120 are displayed (i.e. left or right, in FIG. 3A), the icons 120 are caused to move (left or right) relative to the pointer 130 (step 230). However, if the icons 120 are caused to move past the pointer 130 (step 235), the icons 120 are hidden from the display 100 (step 237) and device execution reverts to the primary function (step 210).

Of course, rather than being displayed horizontally, as shown in FIG. 3A, the icons 120 may be displayed vertically in which case operation of the controller 110 up or down causes the icons 120 to move vertically relative to the pointer 130.

In response to the user operating the controller 110 (step 240) in a direction perpendicular to the presentation of the icons 120 (i.e. up or down in FIG. 3A), the icon closest to pointer 130 may be selected. More particularly, the closest icon may be selected to perform a specific function associated with the icon, or to display a next (N+1) level of menu selection. Thus, at step 250 a determination is made as to whether the icon closest to cursor 130 relates to the next (i.e. deeper) menu level. If not, then a determination is made (step 252) as to whether the icon closest to cursor 130 relates to a secondary function. If a determination is made (step 252) that the icon closest to cursor 130 relates to a secondary function, then the secondary function is executed (step 254), the icons 120 are hidden from the display 100 (step 256), and process control returns to step 200. For example, in FIG. 3A icon 120B (push-pin) is closest to pointer 130, such that a waypoint entry function may be selected by depressing the 'up' button of controller 110. The waypoint and position return functions implemented by selecting icons 120B or 120C, respectively, do not form part of the present invention but would be known to a person of skill in the art.

If, on the other hand the icon closest to cursor 130 relates to the next (i.e. deeper) menu level (a YES at step 250), then the index N is incremented (step 255) and the second level (N=2) of the hierarchical menu is displayed (step 220) revealing a new set of selectable icons related to the icon closest to pointer 130. Process flow then returns to step 225. Thus, for the search function (icon 120A) discussed above, the next menu level may consist of three further icons 120A, 120B and 120C. The second-level icon 120A may represent a 'filter' function to search between features currently in-view on the display 100 or 'world' features outside of the display area. The second-level icon 120B may represent a 'category' function to search for features based on category (e.g. hospitals, parks, lakes, major highways, secondary highways, etc.). The second-level icon 120C may represent an 'index' function to facilitate searching through an alphabetical list using fine and coarse-grained controls, as set forth for example in a PCT application filed at the Canadian Receiving Office on Mar. 11, 2005, by Redsky Mobile Inc., entitled Restricted User Interface Navigation.

Of course, rather than representing search, waypoint and location return functions, as set forth above, the icons 120 may represent any context-sensitive functions or features. For example, if the pointer 130 is adjacent an area of interest (e.g. a restaurant) after a period of controller inactivity following panning of the map (a YES decision at step 215), the icons 120 for the first level of the menu may represent user functions associated with the area of interest. Thus, where the device is a wireless communications device with GPS functionality, icon 120A may represent, for example, a restaurant menu, icon 120B may initiate a wireless phone call to the restaurant (e.g. to make a reservation), and 120C may, as before, depict a 'U-turn' graphic for causing the map to return to the GPS current location. A person of skill in the art will appreciate that there are numerous context-sensitive functions and menu hierarchies, all of which are navigable using the methodology presented herein.

Therefore, as set for the herein, a user is able, by simple operation of the two-dimensional controller 110, to navigate multiple (i.e. nested) levels of a hierarchical menu system and to select or initiate specific context-sensitive functions with only one hand. Moreover, the menu system may be navigated without interfering with a primary function of the electronic device.

The present specification describes an implementation that employs GPS positioning. As discussed above, the principles set forth herein are not restricted to GPS-enabled devices (or any other location-enabled devices, such as cellular devices with location determined via triangulation, Bluetooth or other short-range location-enabled devices, etc.). Rather, this specification is directed to a system and method for navigating hierarchical menu systems with a two-dimensional controller, irrespective of the application. It is envisaged that a person of ordinary skill in the art, in view of the present specification and drawings, could adapt the present techniques to operate with other controllers than a two-dimensional controller. For example, a roller wheel and an auxiliary input could be combined to provide a two-dimensional controller whereby when the roller wheel is actuated independent of the auxiliary input the roller wheel controls one dimension, and when the roller wheel is actuated in conjunction with the auxiliary input the roller wheel controls another dimension. Such adaptations fall within the contemplated scope of the techniques taught by this specification and drawings.

Many features and advantages will be apparent from this specification and, thus, it is intended by the appended claims to cover all such features and advantages. Further, since numerous modifications and changes will readily occur to those skilled in the art, it is not desired to impose any limit to the exact construction and operation illustrated and described herein, and accordingly all suitable modifications and equivalents may be resorted to, falling within the scope of the claims.

The invention claimed is:

1. A method of operating of an electronic device having a display and a two-dimensional controller, comprising:
   executing a primary function of said electronic device in accordance with operation of said two-dimensional controller and displaying graphics associated therewith;
   in the event said two-dimensional controller has been idle for a predetermined time period ceasing execution of said primary function;

displaying a menu system responsive to further operation of said two-dimensional controller, said menu system having a plurality of icons in proximity to a pointer on a portion of said display and parallel to a detected dimension of initial operation of said two-dimensional controller;

scrolling said icons in a first dimension relative to said pointer responsive to operating said controller in said first dimension; and selecting one of said icons in closest proximity to said pointer responsive to operating said controller in a second dimension.

2. The method of claim 1, wherein said selecting initiates one of either execution of a function associated with said one of said icons or displaying a further level of said menu system associated with said one of said icons.

3. The method of claim 2, wherein said further level of said menu system includes a further a plurality of icons representing further functions related to said one of said icons in closest proximity to said pointer.

4. The method of claim 3, wherein said further functions include at least one of a filter function to search between features currently in-view on said display features outside of the display area, a category function to search for features based on categories, and an index function to facilitate searching through an alphabetical list using fine and coarse-grained controls.

5. The method of claim 1, wherein said second dimension is perpendicular to said first dimension.

6. The method of claim 1, further comprising identifying said graphics prior to displaying said menu system.

7. The method of claim 1, wherein said icons represent context-sensitive functions.

8. The method of claim 7, wherein said context-sensitive functions include at least one of searching for information relating to a feature of interest in proximity to said pointer, setting a location waypoint, and returning to a current location.

9. The method of claim 1, further comprising ceasing display of said menu system responsive to scrolling said icons beyond a last one of said icons.

10. An electronic device, comprising:
a display;
a two-dimensional controller; and
a processor for (i) executing a primary function of said electronic device in accordance with operation of said two-dimensional controller and displaying graphics associated therewith, (ii) ceasing execution of said primary function in the event said two-dimensional controller has been idle for a predetermined time period, (iii) displaying a menu system responsive to further operation of said two-dimensional controller, said menu system having a plurality of icons in proximity to a pointer on a portion of said display and parallel to a detected dimension of initial operation of said two-dimensional controller, (iv) scrolling said icons in a first dimension relative to said pointer responsive to operating said controller in said first dimension, and (v) selecting one of said icons in closest proximity to said pointer responsive to operating said controller in a second dimension.

11. The system of claim 10, wherein said processor selectively initiates one of either execution of a function associated with said one of said icons or displaying a further level of said multi-hierarchical menu system associated with said one of said icons.

12. The system of claim 11, wherein said processor identifies said graphics prior to displaying said menu system.

13. The system of claim 11, wherein said further level of said menu system includes a further a plurality of icons representing further functions related to said one of said icons in closest proximity to said pointer.

14. The system of claim 13, wherein said further functions include at least one of a filter function to search between features currently in-view on said display features outside of the display area, a category function to search for features based on categories, and an index function to facilitate searching through an alphabetical list using fine and coarse-grained controls.

15. The system of claim 10, wherein said second dimension is perpendicular to said first dimension.

16. The system of 10, wherein said icons represent context-sensitive functions.

17. The system of claim 16, wherein said context-sensitive functions include at least one of searching for information relating to an area of interest in proximity to said pointer, setting a location waypoint, and returning to a current location.

18. The system of claim 10, wherein said controller ceases display of said multi-hierarchical menu system responsive to scrolling said icons beyond a last one of said icons.

* * * * *

UNITED STATES PATENT AND TRADEMARK OFFICE
CERTIFICATE OF CORRECTION

| | | |
|---|---|---|
| PATENT NO. | : 7,689,930 B2 | Page 1 of 1 |
| APPLICATION NO. | : 12/406396 | |
| DATED | : March 30, 2010 | |
| INVENTOR(S) | : Eric Johnson et al. | |

It is certified that error appears in the above-identified patent and that said Letters Patent is hereby corrected as shown below:

Title Page 2, Item (56) FOREIGN PATENT DOCUMENTS, line 2,
"WO   98/37694   9/1998" should read --WO   98/37694   8/1998--.

Column 3, line 37, "(N+1)" should read --(N+1)th--.

Column 4, line 23, "for the" should read --forth--.

Column 4, line 60, "of operating of an electronic" should read --of operating an electronic--.

Column 5, line 18, "a further a plurality" should read --a further plurality--.

Column 6, line 23, "a further a plurality" should read --a further plurality--.

Column 6, line 35, "The system of 10," should read --The system of claim 10,--.

Signed and Sealed this
Fourteenth Day of August, 2012

David J. Kappos
*Director of the United States Patent and Trademark Office*